March 22, 1966    J. P. BURGARELLA    3,241,471
SHUTTER APPARATUS
Filed March 29, 1963    3 Sheets-Sheet 1

INVENTOR.
John P. Burgarella
BY Brown and Mikulka
and
Donald M. Sandler
ATTORNEYS March 22, 1966  J. P. BURGARELLA  3,241,471
SHUTTER APPARATUS
Filed March 29, 1963  3 Sheets-Sheet 3

INVENTOR.
John P. Burgarella
BY Brown and Mikulka
and
Donald M. Sandler
ATTORNEYS United States Patent Office 3,241,471
Patented Mar. 22, 1966

3,241,471
SHUTTER APPARATUS
John P. Burgarella, Sudbury, Mass., assignor to Polaroid Corporation, Cambridge, Mass., a corporation of Delaware
Filed Mar. 29, 1963, Ser. No. 269,114
4 Claims. (Cl. 95—55)

This invention relates to shutter control means for controlling the exposure time of a camera, and more particularly to shutter control means of the type that is responsive to light from a scene being photographed for causing the exposure time to be functionally related to the level of scene brightness.

One recently developed shutter control means of the type described is provided with shutter operator means actuatable to cause the shutter means of the camera to initiate exposure, and deactuatable to cause it to terminate exposure, so that the exposure time is essentially the time that said shutter operator means is actuated. To control this time, the control means is further provided with shutter timing apparatus including a voltage sensitive trigger circuit for actuating and deactuating the shutter operator means; and an R-C circuit having, as a component, a photoconductive element whose resistance is functionally related to the level of brightness of a scene to which the element is exposed. When the R-C circuit is activated substantially at the same time the trigger circuit actuates the shutter operator means, it generates a time variable voltage that reaches a trigger voltage in a period of time dependent upon the parameters of the R-C circuit including the resistance of the element as established by the level of scene brightness.

The voltage sensitive trigger circuit includes an input transistor stage, the input signal to which is the time variable voltage of the R-C circuit. Such voltage causes the input stage to be biased to cut-off until the trigger voltage is reached, and when this occurs the stage is forward biased into conduction. During the time that the input stage is reverse biased, another transistor stage, operatively associated therewith, is permitted to conduct and is effective to actuate the shutter operator means; and when the input stage conducts, it causes the other stage to stop conducting and to deactuate the shutter operator means, so that the actual exposure time, as established by the actuation time of the shutter operator means, is essentially the time required by the R-C circuit, after activation, to generate the trigger voltage. Regenerative feedback between the stages causes conduction to rapidly switch in response to the generation of the trigger voltage.

Shutter means, with which the above-described apparatus is particularly well suited for use, may include a pair of movable blades, each having a blocking position overlying the exposure aperture of a camera and an unblocking position uncovering the aperture. Prior to the initiation of exposure, the opening blade is in blocking position and releasably retains the closing blade in unblocking position. When the opening blade moves to unblocking position, exposure is initiated because the shutter operator means, operably associated with the closing blade, is actuated and serves to releasably retain the latter in unblocking position; and exposure is terminated when the shutter operator means is deactuated to release the closing blade for movement to blocking position.

With shutter means in the form above-described, the shutter operator means may advantageously take the form of an electromagnet which is energized to attract the closing blade and maintain the latter in unblocking position after the opening blade moves to unblocking position, and deenergized to release the closing blade for movement to blocking position. When the electromagnet is to be energized at the last possible moment (that is, just prior to the time when the opening blade is no longer effective to retain the closing blade in unblocking position) the exposure time is essentially the time that the electromagnet is energized, which in this context is intended to describe the time that the shutter operator means is actuated.

One of the problems associated with cameras utilizing an electromagnet for the shutter control means is concerned with malfunctions in the operation thereof characterized by failure of the electromagnet to provide the correct force to hold the closing blade against premature release during the time of exposure, while at the same time permitting the closing blade to be released properly by the magnet to terminate exposure at the desired time. Ideally, the magnetic holding force on the closing blade should be no larger than necessary to overcome the spring force on the blade and various shock loads due, primarily, to the bottoming of the opening blade, particularly if the device is to be battery operated, and the current available to produce the magnetic force is limited. Since the magnetic holding force depends to a large extent upon the manner in which the closing blade completes a magnetic circuit with the pole-piece, it is apparent the alignment of the blade with the pole-piece will be critical. In other words, the holding force decreases as the alignment of the blade with the pole-piece becomes less precise. The alignment problem is aggravated by the fact that the electromagnet and the blade are each mounted separately in the camera.

Therefore, the primary object of this invention is to reduce the sensitivity of the holding force to the degree of alignment of the blade with the pole-piece while simultaneously enhancing the proper reduction in the holding force to effect blade release at the proper time.

Briefly, the invention involves the recognition that the holding force between the mating surfaces of a keeper and the pole face of a magnet is enhanced by causing the flux distribution therebetween to be non-uniform, and that the same configuration of the mating surfaces producing the desired flux distribution can be utilized to reduce the precision of alignment necessary to produce the desired holding force. Structurally, the invention contemplates providing one mating surface that is flat and one mating surface that is rounded.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 1:
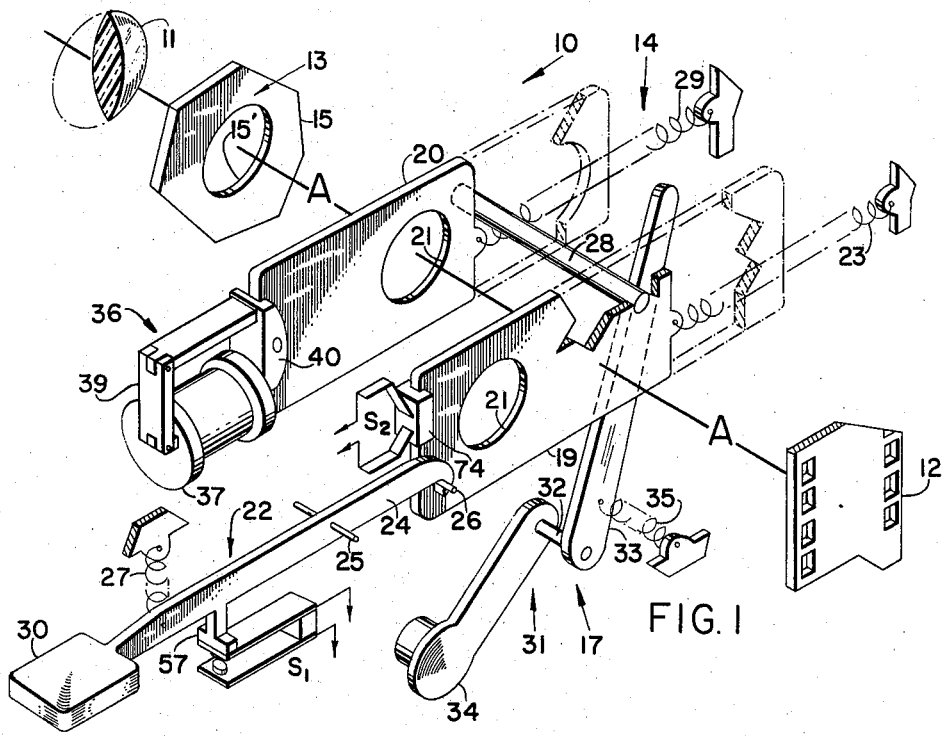
FIGURE 1 is a schematic representation of a camera of a type particularly well adapted for use with the present invention.

The shutter control means to be described is shown in the drawing as embodied into a camera having a particular type of shutter means, but the later is for the purpose of illustrating the invention in a simple environment, it being understood that other types of shutter means could also be used with the shutter control means disclosed and claimed herein in order to derive the new and improved results attendant thereto.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Figure 2:
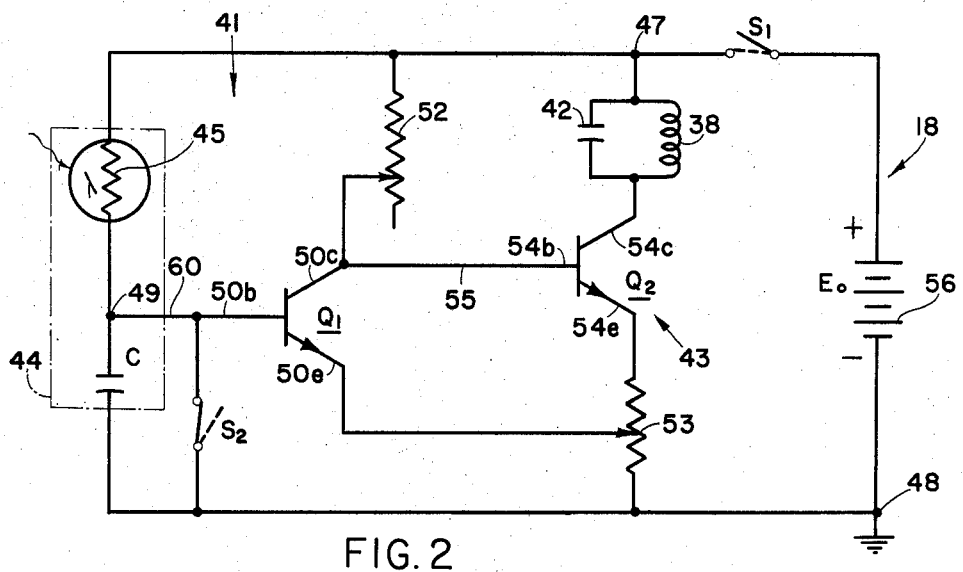
FIG. 2 is a schematic electrical diagram of the present invention.

Shutter mechanism 14 may include shutter means 17, and shutter control means 18 as shown in FIG. 2. Shutter means 17 may take the form of a pair of planar, opaque blades 19 and 20, each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be. The blade that causes exposure to be initiated is called the "opening" blade. The terminal position at which the opening blade is closed is termed the "blocking" position, while the position intermediate the two terminal positions of the opening blade at which it initiates exposure is termed the "unblocking position." Conversely, the blade that causes exposure to be terminated is called the "closing" blade. The terminal position at which the closing blade is open is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasable coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preselected period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preselected period of time, shutter control means 18 causes closing blade 20 to be released thus terminating exposure when the latter is moved from open to blocking position by the action of bias spring means 29.

When exposure is terminated, blades 19 and 20 are in the position shown by the broken lines of FIGURE 1. That is to say, blade 19 is in open position and blade 20 is in blocking position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may taken the form of an electromagnet 37 which has solenoid 38 would around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus 41, the purpose of which is to furnish an energizing current to the solenoid 38 of electromagnet 37. Where the camera is to be portable and hence battery operated, it is essential to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid 38 and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is an initial movement of keeper 40 as the closing blade is drawn toward unblocking position by the spring bias. The time between the instant that the current in $Q_2$ is rapidly reduced and the instant that release of the closing blade is accomplished is very small in terms of the ordinary exposure interval, being only a fraction of a millisecond. For this reason, it is considered that the conduction of $Q_2$ is reduced, and movement of the closing blade begins at substantially the same time. For the reasons set forth above, namely rapid switching of the current input to the solenoid and low power consumption, shutter timing apparatus 41 takes the form of a transistorized, two-stage, modified Schmitt-type trigger circuit 43, responsive to the output voltage from network 44, for controlling the actuation and deactuation of shutter operator means 36. The voltage sensitive trigger circuit 43 has a normally not-conducting stage that includes transistor $Q_1$ preferably of a silicon type, having base, collector and emitter electrodes 50b, 50c and 50e respectively. Collector electrode 50c of $Q_1$ is connected to terminal 47 of the shutter timing apparatus by variable bias resistor 52, and emitter electrode 50e of $Q_1$ is connected to terminal 48 of the shutter timing apparatus by variable bias resistor 53. The normally conducting stage of circuit 43 includes transistor $Q_2$ having base, collector and emitter electrodes 54b, 54c, and 54e. Collector electrode 54c is connected to terminal 47 through solenoid 38 so that the latter is energized when $Q_2$ conducts. Base electrode 54b of $Q_2$ is connected to collector electrode 50c of $Q_1$ through lead 55, and emitter electrode 54e of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally not-conducting" and "normally-conducting" it should be obvious that this characterization is applicable only when a voltage source is applied across terminals 47 and 48.

Figure 3:
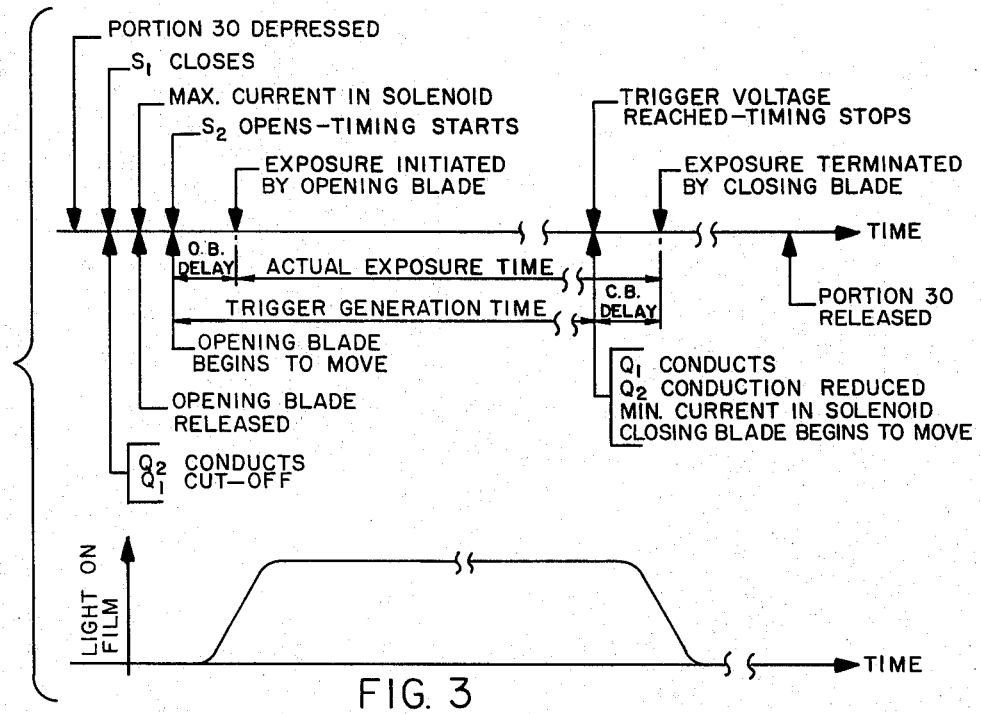
FIG. 3 is an expanded time-scale diagram for the purpose of illustrating the chronology of events associated with effecting exposure utilizing the camera of FIGURE 1 and the electrical system of FIG. 2.

In order to apply voltage source 56, shown in the form of a battery of potential $E_0$ connected from terminal 48 to terminal 47 through normally open switch S1, in such a way as to minimize current drain on the battery, actuator lever 24 is provided with switch operating arm 57 that is engageable with one of the contacts of switch S1. When the lever is manually depressed to disengage coupling means 22 from opening blade 19, the contacts of switch S1 will be closed. The sequence of events that occur as a result of the depression of end portion 30 will now be explained by making reference to the expanded time-scale diagram shown in FIG. 3. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substantially exceeds the longest average exposure apt to be used under normal "snap-shot" conditions of scene brightness, the contacts of switch S1 will be closed for at least as long as the correct exposure time.

Inspection of $Q_2$ stage of circuit 43 indicates that base electrode 54b is the input to this stage, collector electrode 54c is the output, and emitter electrode 54e is common to the input and output. Resistor 52 coupled between input electrode 54b and terminal 47 acts as a fixed base resistor for providing, when S1 is closed, a fixed base current bias that causes $Q_2$ to conduct instantaneously with the closing of S1. The setting of variable resistor 52 establishes the degree to which $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive block 74 on the opening blade engages the contacts of S2 whereby the latter is closed. Connection 49 is at an initial value of voltage, namely ground potential, at the instant S1 is closed. When the voltage at connection 49 is at its initial value and the voltages at the collector and emitter electrodes of $Q_1$ are at their first values of bias voltage due to the conduction of $Q_2$, the collector-base and emitter-base junctions of $Q_1$ are reverse biased, thus resulting in $Q_1$ being cut off. For this reason, it may be said that the bias of $Q_1$ is primarily established by the voltage at connection 49.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive block 74 to disengage the contacts of S2 thereby opening the same to apply the voltage source across timing network 44 and activate the same. Network 44 includes capacitor means C in series with photoconductive element 45, such as a cadmium sulfide photocell or the like exposed to light from the scene being photographed and having a resistance inversely related to the level of scene brightness. Network 44 is connected between terminals 47, 48 of the shutter timing apparatus so as to form a conventional integrator circuit whose input terminal is at 47, and whose output terminal is at 49, the connection between the capacitor means and the photoconductive element. Terminal 49 is connected by fixed impedance 60 to base electrode 50b of $Q_1$, the latter electrode constituting the input electrode of that stage.

The opening of S2 activates network 44, which is to say that the latter is caused to generate, at connection 49, a voltage having an initial value (in this case ground potential) which causes $Q_1$ to be reverse biased to cut-off, and then changes with time reaching a preselected value, termed the trigger voltage, which forward biases $Q_1$, in a period of time termed the trigger generation time.

When the voltage at connection 49 reaches the trigger voltage, it causes the emitter-base junction of $Q_1$ to be forward biased. Now, element 45 functions like a base resistor whose value is dependent upon the level of scene brightness and provides base current bias that causes $Q_1$ to conduct producing collector current at the output electrode thereof which flows through resistor 52 increasing the voltage drop thereacross and lowering the voltage at the input electrode of $Q_2$. This reduces the forward bias on $Q_2$ thus decreasing the flow of current through the latter and causing a reduction in the voltage drop across bias resistor 53 thereby increasing the forward bias on $Q_1$ even more. This regenerative feedback between the stages of voltage sensitive trigger circuit 43 will cause conduction to switch rapidly from $Q_2$ to $Q_1$, if sufficient collector current is available in $Q_1$. Assuming this is true, the different flows of current through bias resistors 52 and 53 after switching takes place establish second values of bias voltages at electrodes $50c$ and $50e$ of $Q_1$ such that the conduction of $Q_2$ is severely and rapidly reduced thereby rapidly deenergizing solenoid 38 to effect a sharp release of the closing blade.

When the closing blade is released, it begins to move out of unblocking position, and will terminate exposure at its blocking position as explained previously. Thus, the shutter means terminates exposure in response to deactuation of the shutter operator means. Referring again to FIG. 3, it can be seen that the time interval between when timing starts (the opening of S2) and when timing stops (the trigger voltage is reached), will be exactly the same as the time interval between when exposure is initiated and when exposure is terminated, provided only that the opening blade delay is the same as the closing blade delay, even though the two time intervals are not concurrent throughout. This disclosure assumes the delay times are essentially the same, so that the actual exposure time is essentially the same as the trigger generation time.

Referring again to FIG. 3, it is apparent that the time interval between the release of the opening blade and its initial movement to open S2 can be made extremely small by proper bias applied to the blade. Furthermore, the time between the closing of S1 and the attainment of maximum restraining force on the closing blade can likewise be made extremely small by various expedients. Thus, all the events that occur between the closing of S1 and the opening of S2 can be said to occur substantially at the same time, particularly since the time interval involved is a minute fraction of the actual exposure time. This disclosure therefore assumes that the actual exposure time is essentially the time that the current through the solenoid is sufficient to maintain the closing blade in unblocking position; or in other words, the time that the shutter operator means is actuated.

Figure 4:
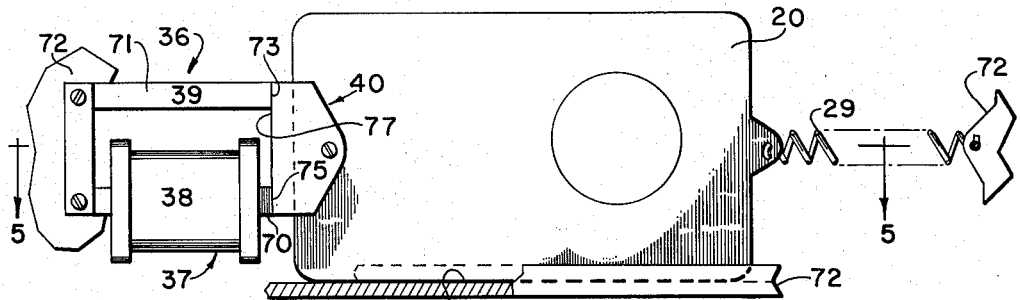
FIG. 4 is a side view of the closing blade held by the electromagnet.
Figure 5:
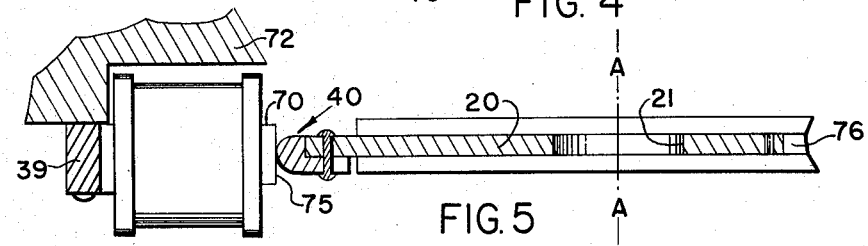
FIG. 5 is a section taken through the line 5—5 in FIG. 4.

The problem of securely holding the closing blade against premature release without detrimentally affecting release at the desired time will now be discussed by making reference to FIG. 4 which is a sideview of the closing blade and shutter operator means taken normal to the optical axis of the camera. As described previously, shutter operator 36 includes solenoid 38 wound around one leg 70 of magnetizable core or pole-piece 39 that is essentially U-shaped with parallel spaced legs 70 and 71. Fastening means, such as screws or rivets, are used to securely fasten electromagnet 37 to camera housing 72. The free ends of legs 70, 71 define separate flat surfaces 73, 75 that lie in a plane essentially normal to the plane of closing blade 20, the latter being mounted in guide track 76 in camera housing 72. FIG. 4 shows blade 20 in a terminal position at which its exposure orifice 21 is aligned with the optical axis.

Electromagnet 37 and blade 20 are so oriented in their respective connections to the camera housing that movement of the blade to the terminal position shown in FIG. 4 against the action of spring means 29 moves keeper 40 into engagement with surfaces 70, 73 of core or pole-piece 39 to define a closed magnetic circuit; and movement of the blade to its other terminal position at which orifice 21 is misaligned with the optical axis moves keeper 40 out of engagement with surfaces 70, 73.

As previously described, blade 20 is in the position shown in FIG. 4 just prior to the initiation of exposure, being held there by reset arm 28 on blade 19. When S1 is closed by manual depression of portion 30 of lever 24, current flows through solenoid 38 establishing in the closed magnetic circuit defined by pole-piece 39 and keeper 40, a certain magnetic flux dependent upon the amount of current (setting of resistor 52 in the base circuit of $Q_2$), and the reluctance of the magnetic circuit. For a given configuration of mating surfaces between the keeper and the pole-piece, the magnetic force on the keeper depends upon the amount of current passing through the solenoid. Since the camera is to be battery operated, it is essential to keep this current to a minimum consistent with preventing accidental blade release. Thus, the current is adjusted to produce a magnetic force urging the blade toward its unblocking position that is larger than the force of spring means 29 urging the blade toward its blocking position, and is sufficient to prevent shock loads transmitted through the housing, when the opening blade bottoms and initiates exposure, to both the electromagnet and the closing blade from accidentally jarring the keeper from the pole-piece and increasing the reluctance to the point where blade release occurs.

Figures 6, 7:
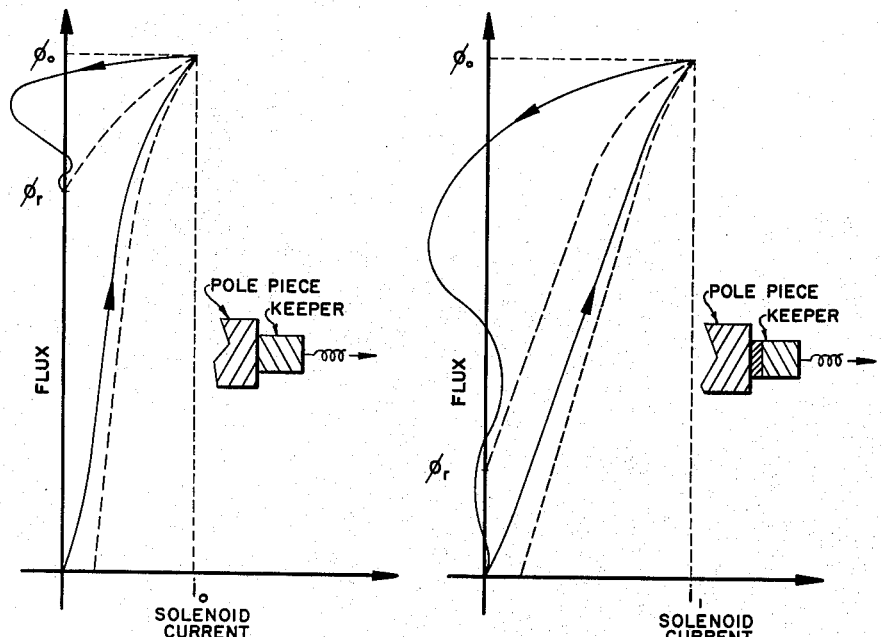
FIGS. 6 and 7 are graphs showing the effect of utilizing an air gap in a conventional magnetic circuit.

The difficulty with conventional mating surfaces between the pole-piece and the keeper is illustrated in FIG. 6. Here, the mating surfaces are both flat with essentially zero air gap. The graph shows a portion of a typical D.-C. hysteresis loop, with the flux in the magnetic circuit plotted as a function of solenoid current. If a current of value $i_0$ is caused to flow in the solenoid as a result of the conduction of $Q_2$, the flux in the magnetic circuit will be $\phi_0$. The magnetic force is related to the square of the magnetic induction or flux density so that the value $\phi_0$ is assumed to a value which provides the desired force that resists both spring means 29 and shock loads. When $Q_2$ is suddenly cut-off, the flux does not decrease along the D.-C. path because of the resultant sudden change in the solenoid current. Rather, the path is substantially like that shown in broken lines, and while the current in the solenoid suddenly decreases to zero, the flux changes only slightly to its residual value, $\phi_r$. If the force corresponding to $\phi_r$ is larger than the spring force, no release will occure. Thus, while a relatively low current is necessary to produce the desired magnetic force, the difference between the latter and the residual force is so small that with a reasonable margin of safety between the desired force and the spring force, release of the blade will not be effected. The flux thus remains at $\phi_r$.

When an air gap of predetermined size is provided in the magnetic circuit, the resultant D.-C. hysteresis loop is obtained by adding to the loop shown in FIG. 6, the hysteresis loop of the air gap. The result, shown in FIG. 7, is that the residual flux is shifted to a different value of $\phi_r$, a value very much lower than $\phi_r$ represented in the FIG. 6 illustration. Now, there is a large difference between the flux necessary to produce the desired force and the residual flux, so that the spring force is between the desired force and the residual force, and blade release occurs permitting the flux to decrease to zero. Of course, this advantage is attained at the expense of increasing the exciting current from $i_0$ to $i_1$.

Figure 8:
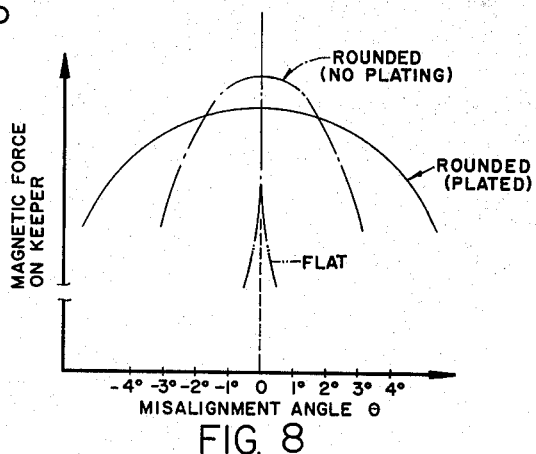
FIG. 8 is a graph showing the variation in magnetic force resulting from imprecise alignment.

The primary disadvantage with the flat mating surfaces is the difficulty in securing perfect alignment therebetween. The result of imperfect alignment is shown in FIG. 8. Flat mating surfaces provide a very large magnetic force, but this force decreases rapidly with misalignment. The reason for this is of course that misalignment increases the air gap, and since the reluctance of the magnetic circuit is extremely sensitive to the size of the air gap, the magnetic force decreases rapidly. Thus, in a situation where the solenoid-pole-piece is to be mounted separately from the keeper, it is possible to achieve the necesary alignment but only at the expense of a heavy, rigid mounting provided with means to adjust the portion of the housing on which the polepiece is mounted relative to the track in which the blade moves. It is therefore preferable to provide a configuration which is relatively insensitive to misalignment, and which is capable of producing the desired magnetic force.

To this end, the air gap is made non-uniform in such a way that advantage is taken of the increased magnetic force attainable with a non-uniform flux distribution across the opposite magnetic equipotential surfaces of the keeper and the pole-piece, while permitting substantial misalignment to occur without seriously reducing the magnetic force. Preferably, the surfaces 70, 73 are made flat and the surface 77 of keeper 40 is made a segment of a cylinder, so that the surfaces meet in a line contact instead of in an area contact as would be the case were all of the surfaces flat. The line contact will of course have a zero air gap if the keeper is entirely magnetizable. However, the gap between the surfaces will increase as the lateral distance from the line of contact increases. Because surface 77 is cylindrical in nature, with the generatrix of the surface being parallel to the plane of the blade and perpendicular to the optical axis, considerable misalignment of the keeper relative to the pole-piece can occur without substantial change in the nature of the air gap.

The effect of misalignment is shown in FIG. 8 for a rounded keeper. Several degrees of misalignment can be accommodated before the magnetic force drops below a critical minimum. The ability to tolerate misalignment is enhanced by plating the keeper with a non-magnetic material. Because the non-magnetic "air" gap at contact is no longer zero, the magnetic force obtainable when there is perfect alignment is slightly less than when the keeper is unplated. However, the force drops much less rapidly with misalignment.

Figure 9:
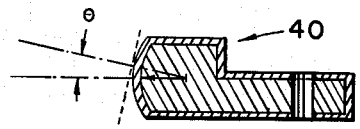
FIG. 9 is an enlarged view of a keeper constructed in accordance with the present invention.

As seen in FIG. 9, the angle of misalignment is conveniently thought of as the angle between the plane of the blade and the normal to the pole faces 70, 73. It should be obvious that surfaces 70, 73 could be made cylindrical and surface 77 made flat. However, it should be recalled that one of the requirements for proper operation of the shutter timing mechanism is that the closing blade delay be the same as the opening blade delay (see FIG. 2). Therefore, it is necessary to keep the mass of keeper 40 as low as possible. Accordingly, keeper 40 is made as thin as possible in transverse section, and pole-piece 39 is considerably larger in section so that in operation, keeper 40 is essentially saturated by the current flowing in the solenoid. For this reason, it is the keeper that is rounded.

The non-uniform flux distribution across the magnetic equipotential surfaces of the keeper and the pole-piece produces a larger magnetic force than a uniform flux distribution having the average value of the non-uniform distribution. This is true because the magnetic force is proportional to the square of the flux. Therefore, it can now be appreciated that the rounded face of the keeper results in an increase in magnetic force while also reducing mechanical alignment problem, since repeatable magnetic forces can be obtained when bringing a rounded surface to a flat surface.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism for a camera having an exposure aperture for photographing a scene comprising:
    (a) a housing;
    (b) electromagnet means mounted on said housing and having a magnetizable core associated with a solenoid;
    (c) a shutter blade movable on said housing between one terminal position unblocking said aperture and another terminal position blocking said aperture for controlling the passage of incident light therethrough;
    (d) spring means urging said shutter blade toward the the other terminal position when said blade is in said one terminal position;
    (e) magnetic keeper means having a rounded cylindrical surface mounted on said shutter blade for engagement with said magnetizable core;
    (f) said electromagnet means and said shutter blade being constructed and arranged on said housing so that movement of said shutter blade to said one terminal position moves the rounded cylindrical portion of said keeper means into engagement with said core, and movement of said shutter blade out of said one terminal position toward said other terminal position moves said rounded cylindrical portion out of engagement with said core;
    (g) means for energizing said solenoid after said shutter blade is in said one terminal position; and
    (h) means for deenergizing said solenoid after a period of time depending on the level of scene brightness, whereby said magnetic keeper means is firmly held by said electromagnet means against the urging of said spring means during energization of said solenoid and is quickly released by said electromagnet means upon deenergization of said solenoid.

2. A shutter mechanism for a camera having an exposure aperture for photographing a scene comprising:
    (a) a housing;
    (b) electromagnet means mounted on said housing and having a solenoid operably associated with a magnetizable core that is essentially U-shaped with parallel spaced legs;
    (c) the free ends of said legs defining separate surfaces;
    (d) a shutter blade movable on said housing between one terminal position unblocking said aperture and another terminal position blocking said aperture for controlling the passage of incident light therethrough;
    (e) a magnetizable keeper mounted on said shutter blade having surfaces for engaging the separate surfaces of said magnetizable core;
    (f) said electromagnet means and said shutter blade being constructed and arranged on said housing so that movement of said shutter blade to said one terminal position moves said keeper into engagement with said core to define a closed magnetic circuit therewith, and movement of said shutter blade out of said one terminal position toward said other terminal position moves said keeper out of engagement with said core;
    (g) at least one of the engaging surfaces of said magnetizable core and said magnetizable keeper constituting a rounded cylindrical surface such that engagement between said surfaces is essentially along a line;
    (h) means for energizing said solenoid after said shutter blade is in said one terminal position;
    (i) means for deenergizing said solenoid after a period of time dependent on the level of scene brightness;
    (j) resilient biasing means urging said shutter blade toward said other terminal position;
    whereby said magnetic keeper is firmly held by said electromagnet means against the urging of said resilient biasing means during energization of said solenoid and is quickly released by said electromagnet means upon deenergization of said solenoid.

3. A shutter mechanism in accordance with claim 2 wherein said surfaces on said core are flat and lie in a plane, and said surfaces on said keeper are rounded in cross-section.

4. A shutter mechanism in accordance with claim 2 wherein one of said engaging surfaces has a nonmagnetic film thereon that defines a nonmagnetic gap of predetermined size between said engaging surfaces.

References Cited by the Examiner

UNITED STATES PATENTS

| | | | |
|---|---|---|---|
| 2,008,938 | 7/1935 | Tolhurst | 240—1.3 |
| 2,032,380 | 3/1936 | Stevens | 95—63 |
| 2,693,554 | 11/1954 | Vigren | 317—165 X |
| 2,869,048 | 1/1959 | Reed | 317—165 |

JOHN M. HORAN, *Primary Examiner.*

NORTON ANSHER, *Examiner.*